Figure 1:
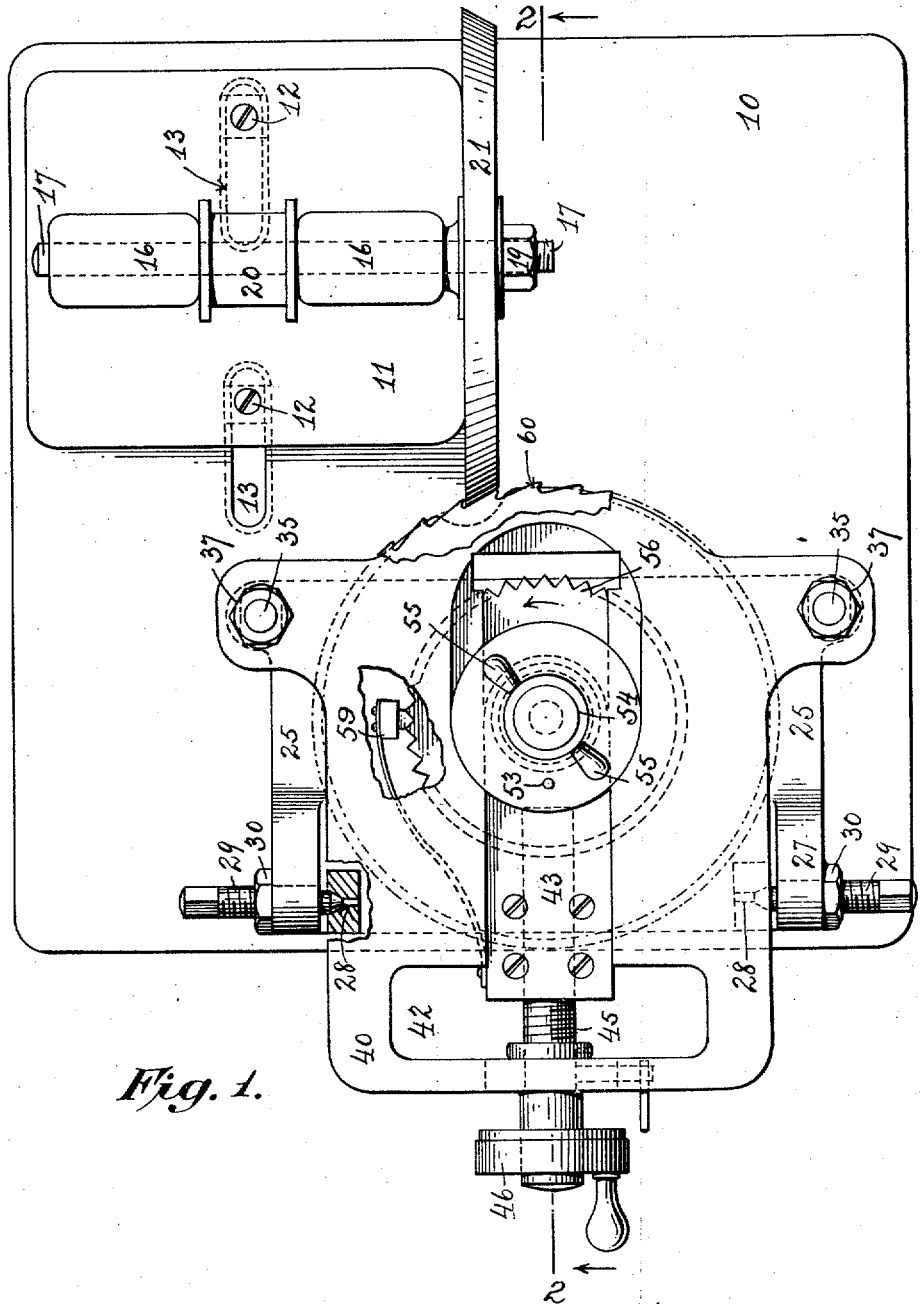

J. ZULEG.
SAW SHARPENER.
APPLICATION FILED JAN. 9, 1914.

1,135,245.

Patented Apr. 13, 1915.
3 SHEETS—SHEET 1.

Attest:
Helen V. Fitzpatrick
Alda L. Miller

Joseph Zuleg, Inventor:
by William R. Baird
his Atty

J. ZULEG.
SAW SHARPENER.
APPLICATION FILED JAN. 9, 1914.
1,135,245.
Patented Apr. 13, 1915.
3 SHEETS—SHEET 2.
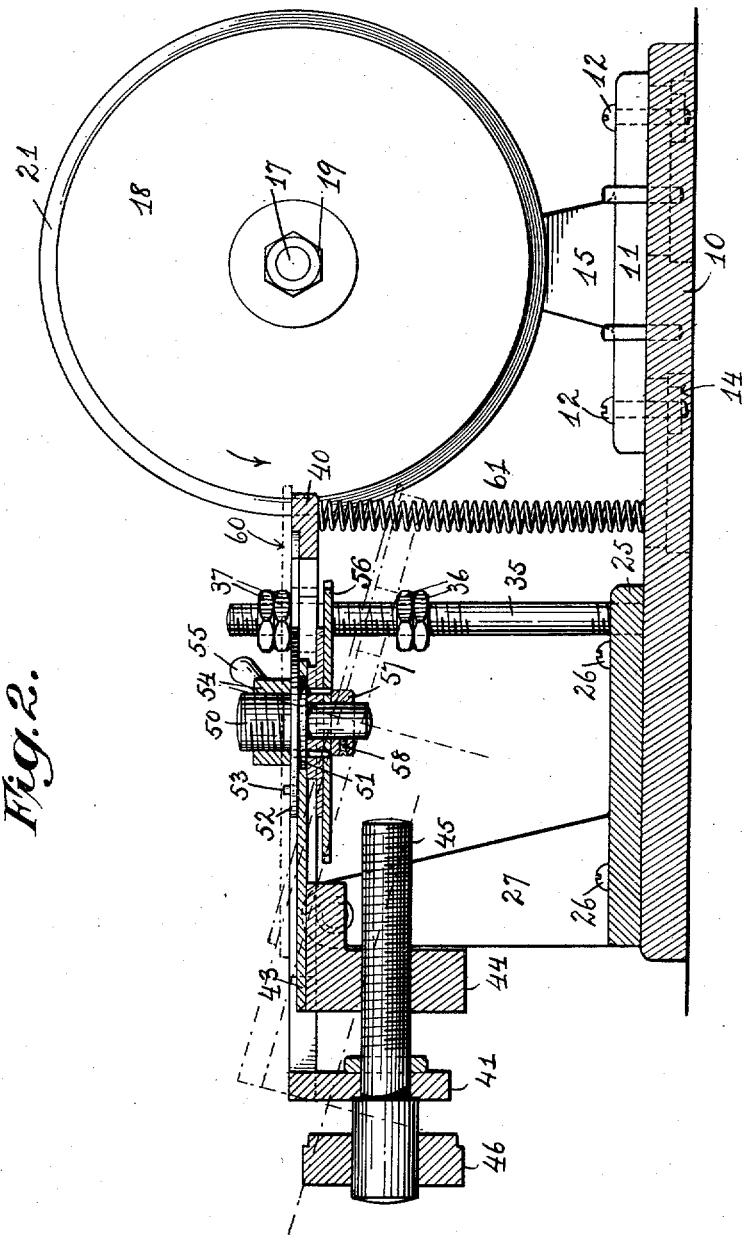
Attest:
Helen V. Fitzpatrick.
Alda L. Miller
Inventor:
Joseph Zuleg
by William R. Baird
his Atty

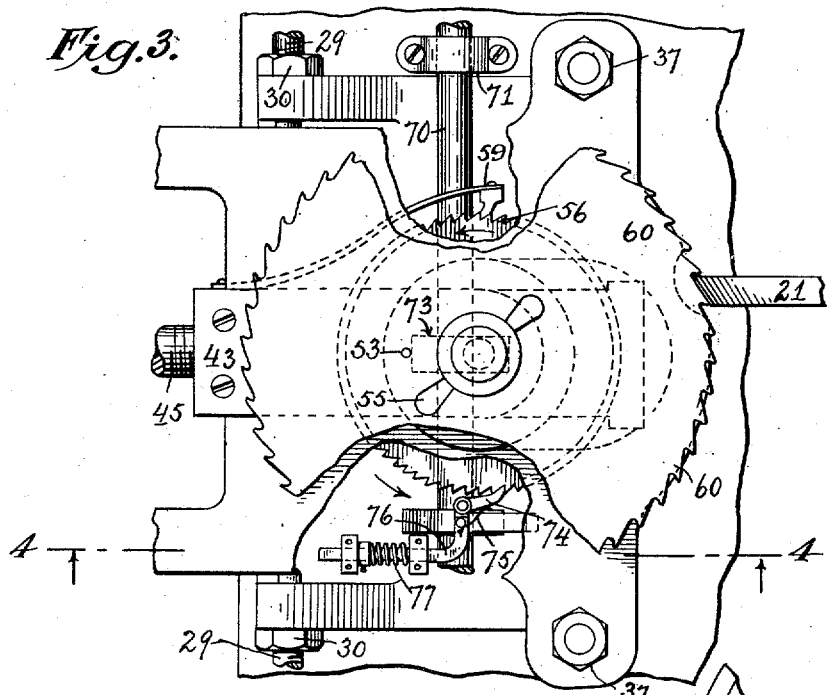

UNITED STATES PATENT OFFICE.

JOSEPH ZULEG, OF HOBOKEN, NEW JERSEY, ASSIGNOR TO THE BUTTON MACHINERY COMPANY, OF NEW YORK, N. Y., A CORPORATION OF NEW YORK.

SAW-SHARPENER.

1,135,245.  Specification of Letters Patent.  Patented Apr. 13, 1915.

Application filed January 9, 1914. Serial No. 811,178.

*To all whom it may concern:*

Be it known that I, JOSEPH ZULEG, a citizen of the United States, residing at Hoboken, in the county of Hudson and State of New Jersey, have invented certain new and useful Improvements in Saw-Sharpeners, of which the following is a specification.

This invention relates to an apparatus for originally forming the teeth in a circular saw or for reshaping or sharpening the same, and its novelty consists in the construction and adaptation of the parts as will be more fully hereinafter pointed out.

The saws contemplated to be formed or sharpened by means of this device are saws of a usual form having teeth slightly undercut and oblique to the radius of the circular disk of which they form the indented periphery.

In the drawings, in which there is illustrated an apparatus embodying a preferred form of the invention, Figure 1 is a top plan view of the device; Fig. 2 is a vertical section through the same on the plane of the line 2—2 in Fig. 1 and a side elevation of the parts back of the section plane; Fig. 3 is a top plan view of a portion of the device showing an automatically rotated carrier for the saw, and Fig. 4 is a vertical section of the parts shown in Fig. 3 on the plane of the line 4—4 in Fig. 3.

In the drawings, 10 is a base plate adapted to support the other parts of the apparatus.

11 is a supplemental plate adjustably secured to the plate 10 by any suitable means, for instance, bolts indicated at 12 and adapted to be horizontally adjusted in slots 13 formed in the plate 10 for that purpose, and which bolts are held in place by nuts indicated at 14. Secured to, or made integral with, the plate 11 are upright supports 15 terminating in barrel-shaped bearings 16 in line with each other and adapted to receive a shaft 17 on the end of which a grinding wheel 18 of any suitable material, for instance, corundum, is secured by any suitable means, as, for instance, a nut indicated at 19, so that the grinding wheel will revolve with the shaft 17 which is actuated by a pulley 20 also secured to the shaft and moved by means of a belt (not shown) from any suitable form of power. The edge 21 of the grinding wheel is beveled with respect to the plane surface of the wheel and its grinding surface is therefore of the shape of a frustum of a cone. Also adjustably secured to the base plate 10 is a plate 25 held in position by bolts indicated at 26. Springing upwardly from the plate 25 are standards 27 provided at their upper ends with apertures adapted to receive pivots indicated at 28 and which are provided with threaded shanks 29 adapted to be engaged by lock nuts 30 whereby the pivots can be adjustably secured in the standards 27. Also springing upwardly from the plate 25 are two rods 35 threaded and adapted to receive a lower pair of nuts 36 and an upper pair of nuts 37 spaced apart a suitable distance for a purpose presently to be described, one of said pair in each instance constituting a stop or positioning member and the other constituting a lock nut to hold the other nut of the pair rigidly in position.

Centrally mounted between the pivots 28 and adapted to swing on them, is a tiltable table 40 provided with a flange 41 and an aperture 42 which is varied in width and is adapted to receive a slidable carriage 43 having a flange 44 provided with an aperture which is internally threaded and adapted to receive a feed screw 45 which projects through the flange 41 and is provided with a handwheel 46 whereby it may be turned and by which turning the carriage 43 is moved to and fro with respect to the body of the table in the slot formed to receive it.

Within a suitable recess in the carriage provided for that purpose there is arranged a pivot 50 supported on the carriage by means of an annular flange 51 and provided with a larger annular flange 52 secured to which, or made integral therewith, is an upwardly extending positioning pin 53. Above the flange 52 the pivot is externally threaded and adapted to receive an annular nut 54, moved by finger press 55, by means of which a saw indicated at 60 is secured firmly upon the plate 52 and necessarily upon the table 40. Beneath the flange 51 the pivot 50 is extended downwardly and is adapted to receive a ratchet disk 56 provided with an aperture whereby it may be slipped over the pivot and underneath which is arranged a collar 57 to clamp the ratchet disk in position, a set screw 58 being provided to hold it against rotation on the pivot. It will be understood that the lower portion of the pivot which is unthreaded, the upper portion which is threaded and the two flanges 51 and 52 are preferably all made integral. A spring detent 59 secured to the carriage 43 is adapted to engage the teeth of the disk to position it and to prevent over-rotation.

Secured to the table 40 and any fixed part of the device as the plate 10, is a compression spring 61. It should be noted that the grinding wheel is out of line with the center longitudinal medial line of the sliding carriage 43 and with the center of the pivot 50, and consequently of the saw blank or saw secured thereon.

The operation of the described device is as follows: The saw or saw blank is mounted upon the carriage 43 by means of the pivot 50 and firmly secured in place by rotating the annular nut 54 by means of the finger pieces 55. A hole is made in the saw to engage the positioning pin 53 on the flange 52 so as to secure the saw against circular slip. The feed screw 45 is then moved by means of the wheel 46 until the edge of the saw is in the proper position with respect to the edge 21 of the grinding wheel. The power is then turned on, the pulley 20 rotated and the wheel 18 thereby caused to revolve. The operator has in the meantime tilted the table 40 downward and held it there (in the position indicated in dotted outline in Fig. 2) so that the saw will not be touched by the wheel until the proper speed has been attained. This movement of the table compresses the spring 61. The operator then ceases to press downward upon the table and the spring tilts it upward, and as it does so it brings one part of the edge of the saw into contact with the grinding edge of the wheel 18, and the latter cuts away a portion of the saw blank or saw corresponding in shape to the beveled edge of the wheel and the depth of which is governed by the longitudinal distance between such edge and the outer periphery of the saw measured along a radius parallel with the plane of rotation of the saw. The operator then again tilts the table 40 downward at the same time turning the ratchet disk 56 to the left, or clockwise, by means of the finger pieces 55, a space equal to one tooth, so as to position the saw or saw blank for the cutting or sharpening of a new tooth. The spring detent 59 prevents accidental over-rotation of the ratchet disk and accurately positions it to bring the edge of the saw into proper position with respect to the grinding wheel. The nuts 36 and 37 on the rods 35 limit the extent of oscillation vertically of the table 40, and keep its movement within a proper range.

By means of the adjustment of the plate 11 on the base 10 the grinding wheel can be moved with respect to the table 40. The position of the carriage 43 can be varied with respect to the edge of the wheel, and consequently the position of the saw or saw blank with respect to such wheel can be varied by means of the feed screw 45, and the number of teeth to be cut can be varied by removing the ratchet disk 56 and substituting one with a different number of teeth.

The device is readily operated, quickly adjusted, takes little power to actuate it and is very efficient and accurate in its results.

In Figs. 3 and 4 there is illustrated means whereby the operation of intermittently rotating the saw or blank and tilting the table to bring the saw within the cutting zone of the wheel are automatically performed. In the device shown in these figures the parts are the same as before with the exception of some additional parts. In these figures 70 is a shaft mounted to revolve in suitable bearings indicated at 71, and on which shaft is rigidly secured two cams, one 72 adapted to actuate the disk 56 to intermittently rotate the disk 56 and the other 73 adapted to intermittently elevate the tiltable table against the resistance of the spring 61 which, in this construction, is a tension spring tending constantly to pull the table downward. Mounted at a convenient place with relation to the other parts is an operating pawl 74 pressed by a spring 75 into engagement with the teeth of the disk 56. It is provided with a shank 76 surrounded by a spring 77 whereby it is retracted to position after it is caused to make an operative stroke, and it is also provided with a tail 78 of arcuate form adapted to be engaged by the cam 72. As the shaft 70 revolves, the high point of the cam 72 moves against the tail 78 and forces the pawl 74 to the right and thereby moves the disk 56 one tooth. As the shaft continues to revolve its low point of the cam is moved against the tail and allows the spring 77 to move it back to its original position. The arcuate form of the tail 78 is to allow the cam to act against it no matter in what position the table 40 may be tilted. The cam 73 is placed directly under the pivot 50 or directly under some other suitable part of the table 40 or carriage 43. As the shaft 70 revolves, the high point of the cam engages the part of the pivot or table with which it is in contact and lifts the table upward, while, as it continues to revolve and its low point engages such part, the spring 61 depresses the table. It will be understood of course that the parts are so timed that these operations are in proper relation and succession. After the saw or saw blank has made a complete revolution of course the workman should remove the saw, but even if he does not, no harm is done.

What I claim is:

1. A saw cutting device comprising a saw carriage and a saw mounted thereon, a grinding wheel placed so as to overlap the periphery of the saw while the latter is in one position and means for tilting the saw in and out of such position and intermittently rotating it while out of such position.

2. A saw cutting device comprising a saw carriage and a saw mounted thereon, a grinding wheel placed so as to overlap the periphery of the saw while the latter is in one position and means for automatically tilting the saw in and out of such position and intermittently rotating it while out of such position.

3. A saw cutting device comprising a saw carriage and a saw mounted thereon, a grinding wheel placed so as to overlap the periphery of the saw while the latter is in one position and means for tilting the saw in and out of such position and automatically intermittently rotating it while out of such position.

4. A saw cutting device comprising a saw carriage and a saw mounted thereon, a grinding wheel placed so as to overlap the periphery of the saw while the latter is in one position and means for automatically tilting the saw in and out of such position and automatically intermittently rotating it while out of such position.

5. A saw cutting apparatus comprising a tiltable table, a saw carriage mounted thereon and adjustable on the table in one direction, a device for restoring the table to position after it has been tilted, means for rotating the saw carriage while tilted, and a grinding wheel out of contact with a saw on the table when the table is in tilted position and in contact therewith when in normal position.

6. The combination with a saw carriage adapted to be tilted, of a saw secured thereon and a grinding wheel arranged in such proximity to the saw that the mere tilting of the carriage will bring the edge of the saw into contact with the grinding wheel, and means for intermittently rotating the saw while out of such contact.

7. The combination with a saw carriage adapted to be tilted, of a saw secured thereon and a grinding wheel arranged in such proximity to the saw that the mere tilting of the carriage will bring the edge of the saw into contact with the grinding wheel, and means for intermittently rotating the saw while out of such contact and preventing its movement while in such contact.

8. A saw cutting apparatus comprising a tiltable table, a saw carriage mounted thereon and adapted to be adjusted thereon along one direction and secured in position after adjustment, means for mounting a saw on the carriage and means for rotating it intermittently, in combination with means for limiting the extent to which the table can be tilted.

9. A saw cutting apparatus comprising a tiltable table, a saw carriage mounted thereon and adapted to be adjusted thereon along one direction and secured in position after adjustment, means for mounting a saw on the carriage and means for rotating it intermittently, in combination with means for limiting the extent to which the table can be tilted including stops placed on each side of it.

10. A saw cutting apparatus comprising a tiltable table, a saw carriage mounted thereon and adapted to be adjusted thereon along one direction and secured in position after adjustment, means for mounting a saw on the carriage and means for rotating it intermittently, in combination with means for limiting the extent to which the table can be tilted including adjustable stops placed on each side of it.

11. A saw cutting apparatus comprising a tiltable table provided with an aperture, a rod extending through said aperture and provided with stops to limit the extent to which the table can be tilted.

12. A saw cutting apparatus comprising a tiltable table provided with an aperture, a rod extending through said aperture and provided with adjustable stops to limit the extent to which the table can be tilted.

13. A saw tooth cutting device comprising a grinding wheel, a tiltable table adapted to support a saw, a spring for tilting the table away from the grinding wheel, and automatic means for tilting the table into operative engagement with the grinding wheel.

14. A saw tooth cutting device comprising a grinding wheel, a tiltable table adapted to support a saw, a spring for tilting the table in one direction, and automatic means for tilting the table in the opposite direction.

In testimony whereof I affix my signature in presence of two witnesses.

JOSEPH ZULEG.

Witnesses:
ALDA L. MILLER,
HELEN V. FITZPATRICK.

Copies of this patent may be obtained for five cents each, by addressing the "Commissioner of Patents, Washington, D. C."